Dec. 19, 1922.
W. R. SMITH.
FAUCET FOR GLASS TANKS.
FILED JAN. 28, 1920.
1,439,198.
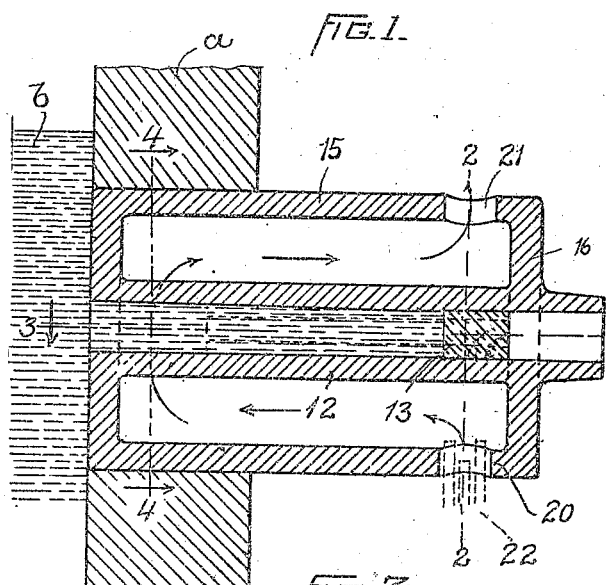
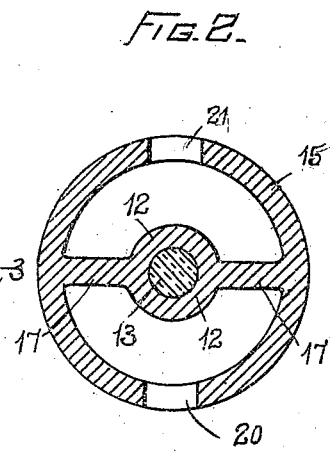
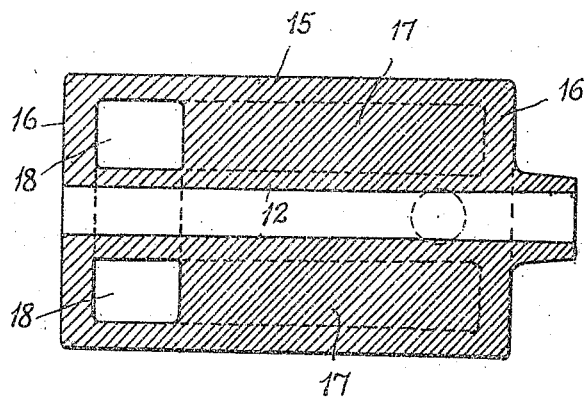
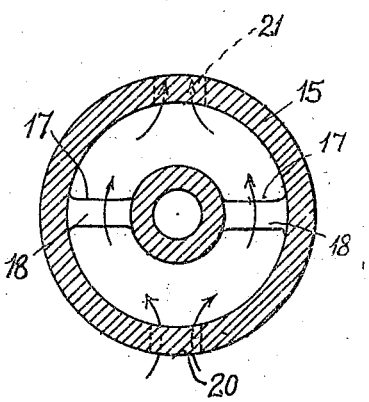
INVENTOR:
W. R. Smith
by Hughes Brown Quimby May
ATTYS.

Patented Dec. 19, 2.

1,439,198

UNITED STATES PATENT OFFICE.

WILLIAM R. SMITH, OF BUFFALO, NEW YORK.

FAUCET FOR GLASS TANKS.

Application filed January 28, 1920. Serial No. 354,618.

*To all whom it may concern:*

Be it known that I, WILLIAM R. SMITH, a citizen of the United States, residing at Buffalo, in the county of Erie and State of New York, have invented new and useful Improvements in Faucets for Glass Tanks, of which the following is a specification.

This invention relates to tanks in which glass ingredients are melted and a body of molten glass stored.

The object of the invention is to provide a faucet through which the molten glass may be delivered as desired, the faucet being adapted to be closed by a spigot or plug of fusible material, such as glass, and heated to melt said spigot and permit a flow of glass from the tank.

The invention is embodied in the improvements which I will now proceed to describe and claim.

Of the accompanying drawings forming a part of this specification,—

Figure 1 is a longitudinal section showing my improved faucet applied to a tank.

Figure 2 is a section on line 2—2 of Figure 1.

Figure 3 is a section on line 3—3 of Figure 1.

Figure 4 is a section on line 4—4 of Figure 1.

The same reference characters indicate the same parts in all of the figures.

My improved faucet is composed of a body of fire clay, or other refractory material, formed to be inserted as a plug in the wall $a$ of a tank containing a body $b$ of molten glass. The body includes a tube 12, the bore of which is adapted to conduct molten glass from the tank, and to be closed by a fusible glass spigot 13. The body is provided with means for conducting a heating medium in contact with said tube, said medium being for example, a Bunsen burner flame, adapted to heat the tube sufficiently to melt the spigot, and thus open the faucet.

The body includes an outer tube 15, forming the external surface of the body and spaced from the tube 12, which I call the inner tube, annular end heads 16, 16, connecting the ends of the outer and inner tubes, and closing the ends of the space between said tubes, and baffle members 17, 17, extending lengthwise of the tubes and connecting opposite side portions thereof. Said baffle members join one of the heads 16, and are separated from the other head by spaces 18, as shown by Figures 3 and 4. The outer and inner tube, the heads 16, and the baffle members 17 form a return flue, adapted to conduct heat along the external surfaces of the inner tube 12, as indicated by the arrows in Figures 1 and 4. The outer tube 15 is provided with a heat inlet 20, at one end of the flue, and with a heat outlet 21, at the opposite end thereof.

A Bunsen burner 22, indicated conventionally by dotted lines in Figure 1, may be inserted in the inlet 20. The flame of said burner impinges on and passes along one side of the inner tube 12, and the corresponding sides of the baffle members 17, then passes through the opening 18, and then passes along the opposite side of the inner tube, and baffle members. The products of combustion escape through the outlet 21, and may be conducted therefrom, if desired, by a pipe (not shown). The inner tube may thus be quickly heated sufficiently to melt a glass spigot 13 previously inserted therein to close the faucet, and any solidified glass behind said spigot, so that the faucet is opened and a flow of glass therethrough is permitted. The faucet should be inserted in the wall $a$ below the level at which the body $b$ is maintained, so that the glass drawn by the faucet will not contain impurities commonly present on the surface of the glass.

I claim:

A faucet for glass tanks, comprising a plug-shaped body of refractory material, formed to be inserted in an orifice in a tank wall, and including an inner tube, the bore of which is adapted to conduct molten glass through the body, and to be closed by a fusible spigot, an outer tube, end heads, and baffle members, said inner tube, outer tube, heads and members forming a return flue, adapted to cause a heating medium to melt a spigot in the inner tube, the outer tube being provided at its outer end portion with a heat inlet located at one side of said baffle members, and with a heat outlet located at the opposite side of the baffle members, the arrangement being such that heat admitted at said inlet passes in one direction along one side of the inner tube from the outer to the inner end thereof, and along the opposite side of the inner tube from the inner to the outer end thereof, so that the inner tube is heated from end to end.

In testimony whereof I have affixed my signature.

WILLIAM R. SMITH.